United States Patent [19]

McDaniel et al.

[11] 4,247,421
[45] Jan. 27, 1981

[54] ACTIVATION OF SUPPORTED CHROMIUM OXIDE CATALYSTS

[75] Inventors: Max P. McDaniel; Melvin B. Welch, both of Bartlesville, Okla.

[73] Assignee: Phillips Petroleum Company, Bartlesville, Okla.

[21] Appl. No.: 35,581

[22] Filed: May 3, 1979

[51] Int. Cl.³ .......................... B01J 21/08; B01J 23/26
[52] U.S. Cl. ..................................... 252/458; 526/106
[58] Field of Search .......................... 252/458; 526/106

[56] References Cited

U.S. PATENT DOCUMENTS

| | | | |
|---|---|---|---|
| 2,951,816 | 9/1960 | Hogan et al. | 252/467 |
| 3,239,498 | 3/1966 | Witt | 526/106 |
| 3,882,096 | 5/1975 | Shida et al. | 526/106 |
| 3,890,249 | 6/1975 | Dietz et al. | 252/458 |
| 4,151,122 | 4/1979 | McDaniel et al. | 252/458 |
| 4,169,926 | 10/1979 | McDaniel | 252/452 X |

Primary Examiner—Carl F. Dees

[57] ABSTRACT

A method for activating supported chromium oxide catalysts in which a dry catalyst of inorganic or organic chromium compound dispersed on a silica-containing substrate (1) is contacted with a normally liquid organic aliphatic hydroxy compound, preferably at or above the boiling point of the hydroxy compound and (2) is reduced in a carbon monoxide containing environment and the reduced composition is reoxidized in an oxygen-containing environment to produce an activated catalyst. Steps (1) and (2) may take place in the opposite order, but both are necessary. A method for producing polymers of ethylene in which ethylene monomer, and suitable comonomer when used, are contacted at polymerization conditions in the presence of a catalyst activated by the method described above.

7 Claims, No Drawings

ACTIVATION OF SUPPORTED CHROMIUM OXIDE CATALYSTS

BACKGROUND OF THE INVENTION

This invention relates to the production of polymers of ethylene. In one of its aspects this invention relates to the activation of chromium-containing catalysts. In another of its aspects this invention relates to the activation of chromium-containing catalysts suitable for use in the production of polymers of ethylene.

Supported chromium oxide catalysts can be used to prepare olefin polymers in a hydrocarbon solution. These catalysts can also be used to prepare olefin polymers in a slurry system in which the polymers are produced in the form of small particles of solid materials suspended in a diluent. This second process, usually referred to as a particle-form process, has the advantage of being less complex than the solution polymerization process. Control of certain characteristics of polymer is considerably more difficult in the particle-form process than in the solution process. For instance, in the solution process, it is known that a lower molecular weight (higher melt flow) polymer is produced as the polymerization temperature is increased. In the slurry process, however, any effort to increase the melt flow to an appreciable extent by increasing temperature causes the polymer to go into solution so that there is no longer a slurry and the basic concept of slurry or particle-form process is destroyed.

It is, therefore, of great interest to provide a method by which melt index control can be effected in polymerization processes, particularly when the method is applicable to such varying polymerization processes as gas phase, solution polymerization, and particle-form polymerization.

It is therefore an object of this invention to provide a catalyst capable of providing polymers of ethylene having a high melt index. It is another object of this invention to provide a catalyst suitable for use in slurry polymerization systems. It is another object of this invention to provide a method for activating a chromium-containing catalyst. It is another object of this invention to provide a catalyst capable of giving good activity and also producing polymer of high melt index.

Other aspects, objects and the various advantages of this invention will become apparent upon reading this specification and the appended claims.

STATEMENT OF THE INVENTION

In accordance with this invention, activation of a supported chromium oxide containing catalyst is effected by fulfilling two requirements: (1) contacting a dry catalyst of inorganic or organic chromium compound dispersed on a silica-containing substrate with a normally liquid organic aliphatic hydroxy compound and (2) reducing the supported catalyst at an elevated temperature in a carbon monoxide containing environment and then reoxidizing it in an oxygen-containing environment at elevated temperature. The order of steps (1) and (2) is not critical, but both steps are essential.

In an embodiment of this invention polymers of ethylene are produced by contacting ethylene monomer—in the presence of olefin comonomer, if used—under polymerization conditions in the presence of a supported chromium oxide-containing polymerization catalyst activated by the process described above and described in greater detail hereinafter.

Production of ethylene polymers is described generally in U.S. Pat. No. 2,825,721 which issued Mar. 4, 1958 to J. P. Hogan and R. L. Banks.

The particle form process is described in U.S. Pat. Nos. 3,087,917 and 3,622,521. Generally, the polymerization temperature can range from about 100° to 250° F. (38°–121° C.) using pressures ranging from about 100 to 700 psia or higher (689 to 4820 kPa), and catalyst concentration of about 0.001 to 10 weight percent based on the weight of reactor contents. The reaction is carried out in a liquid hydrocarbon diluent such that substantially all the polymer formed is insoluble in the diluent and is in solid particle form. The diluent is a paraffin or cycloparaffin having from 3 to 12 carbon atoms per molecule. Examples of such diluents include propane, isobutane, n-decane, cyclohexane, and the like. Hydrogen can be optionally present in the reactor although its presence is not required to obtain the high melt index ethylene polymers produced over the invention catalysts.

The ethylene polymers produced with the catalysts of this invention include normally solid ethylene homopolymers and copolymers, terpolymers, etc. of ethylene. A comonomer or comonomers when used are selected from among higher aliphatic mono-1-olefins containing from 3 to about 10 carbon atoms per molecule and a diolefin which contains from 4 to 5 carbon atoms per molecule.

The normally liquid organic aliphatic hydroxy compounds which can be employed in treating the dry raw or calcined catalysts contemplated in this invention are selected from monohydric and polyhydric compounds including alcohols, simple and polymeric glycols and their monoalkyl ethers and dialkyl ethers. Exemplary compounds include alcohols containing from 1 to about 8 carbon atoms such as methanol, ethanol, propanol, isopropanol, propargyl alcohol, butanol-1, isopentanol, pentanol-1, pentanol-3, 2-methyl-butanol-3, hexanol-1, xylitol, dulcitol, 2-methyl-pentanol-4, heptanol-1, isoheptanol, octanol-1, octanol-2, 2-ethyl-hexanol-1, anhydrosorbitols and fatty acid esters thereof including ethoxylated anhydrosorbitol fatty acid esters. Suitable glycols include ethylene glycol, propylene glycol, 1,4-butylene glycol, diethylene glycol, triethylene glycol, dipropylene glycol, monoethyl ether of ethylene glycol, primary and, secondary monomethyl ethers of propylene glycol, polyethylene glycol, polypropylene glycol, mixed polyethylene-polypropylene glycols and the monoethyl ethers thereof, block copolymers of ethylene oxide and propylene oxide, 2,2-dimethyl-1, 3-propanediol, 1,2,4-butanetriol, glycerol, trimethylolethane, pentaerythritol, and 2-butene-1,4-diol. Preferably, saturated alcohols containing from 5 to 8 carbon atoms are employed, since especially good results are obtained with their use.

Contacting of the dry raw or calcined catalyst with the hydroxy compound can be accomplished in liquid phase, e.g., impregnation, refluxing, etc., alone and in the presence of a second organic compound such as a hydrocarbon, e.g., hexane, a second normally liquid oxygen-containing compound such as an ester, ketone, etc., e.g., ethyl acetate, acetone, and the like. The second organic compound preferably has a lower boiling point than the chosen alcohol. Only after the second organic compound is boiled away does effective contacting of catalyst and hydroxy compound begin.

Contacting of the raw or calcined catalyst with the hydroxy compounds can also be accomplished in gas phase alone or in combination with another gas or vaporized organic compound such as carbon monoxide, nitrogen, ethyl acetate and the like. The contacting, whether with liquid or gaseous phase of the hydroxy compound, is carried out at an elevated temperature ranging from about 200° to 800° F. (93°–426° C.), preferably at or above the boiling point of the hydroxy compound.

Following the contacting process, the treated catalyst is activated following the procedures described in Ser. No. 857,553, filed Dec. 5, 1977, incorporated here by reference. The treated catalyst can be contacted with a gas comprising carbon monoxide at an elevated temperature, e.g. 1600° F. (870° C.) for several hours, purged with nitrogen as the temperature is lowered several hundred degrees, e.g. about 1100° F. (600° C.) and while at this temperature, the catalyst is contacted several hours with an oxygen-containing gas. Following activation, the catalyst is cooled, recovered and stored in a dry atmosphere until ready for use.

The catalysts contemplated consist of an inorganic or organic chromium compound dispersed on a silica-containing substrate. The substrate can be silica or silica admixed with up to about 20 weight percent of another refractory metal oxide selected from among alumina, boria, magnesia, thoria, titania, zirconia and the like and mixtures. The silica-containing support can be admixed in a hydrogel or dry state with the chromium compound employing conventional techniques such as impregnation with an aqueous or nonaqueous solution of a chromium compound, by admixture of particulate chromium compounds and the like. Suitable chromium compounds include chromium acetate, chromium trioxide, ammonium chromate, t-butyl chromate, dicumene chromium, chromium acetylacetonate, and the like. The finished calcined catalysts will comprise chromium oxide, at least a portion thereof consisting of chromium in the hexavalent state. The amount of chromium oxide in the calcined catalyst can range from about 0.1 to 50 weight percent, more preferably from about 0.1 to 10 weight percent.

EXAMPLE 1 (CATALYST PREPARATIONS)

A silica-titania cogel hydrogel containing 2.5 weight percent titanium on a dry basis was obtained commercially. It was prepared by mixing an aqueous solution of sodium silicate with an aqueous-sulfuric acid solution containing a soluble titanium compound, e.g. titanyl sulfate and aging the product about 4 hours at about 194° F. (90° C.). (A) The aged product was purified by washing with a dilute ammonium nitrate solution to reduce the alkali metal content of the gel to less than about 0.1 weight percent. (B) The purified cogel was treated with an aqueous solution of chromium trioxide sufficient to give 1 weight percent chromium calculated for the dry composite and the water removed by azeotrope distillation with ethyl acetate. (C) The resulting product was vacuum dried to remove the organic compound and screened to remove lumps. (D) The dried product was finally calcined in air at about 800° F. (425° C.) to obtain the catalyst. The various steps designated A, B, C, D are included for convenience in order to describe the effects of the invention process more clearly.

All control and invention catalysts were activated for polymerization in a fluidized bed at an elevated temperature by sequential treatment with carbon monoxide, nitrogen purge and air using a flow rate of about 40 l/minute. Fifty cc samples of each catalyst were employed in a lab sized activator during activation using a 350° C./hour heat rise (48 millimeter diameter activator). Each catalyst was heated for 3 hours in a carbon monoxide environment at 870° C., purged about 15 minutes with dry nitrogen to remove CO and heated in air at 600° C. for 2 hours. The cooled, recovered catalysts were stored in dry air until ready for use.

Each catalyst was used in individual runs to polymerize ethylene in a particle form process using isobutane as diluent at a temperature of 107° C. and a reactor pressure of 550 psig (3.8 MPa) ethylene. The recovered polymer was dried and weighed to determine the yield from which catalyst productivity was determined by dividing the yield by the weight of catalyst. The melt index of each sample was determined in accordance with ASTM D1238-65T, Condition E, reported as g/10 minutes and adjusted to a common level of 5000 g productivity.

The catalyst treatments employed, catalyst weights used and polymer results obtained are reported in Table 1.

TABLE I

ETHYLENE POLYMERIZATION WITH TREATED CATALYSTS

| Run No. | Catalyst Pretreatment | Catalyst Properties Color | Pore Vol. cc/g | % Cr (VI) | Catalyst Weight g | Polymer Yield g | Calculated Productivity g polymer per g catalyst | Run Time Min. | Polymer Melt Index | Remarks |
|---|---|---|---|---|---|---|---|---|---|---|
| 1 | none, Step B, vacuum oven dried overnight | Green | 2.61 | —(a) | 0.0428 | 223.8 | 5230 | 53 | 6.9 | Control |
| 2 | none, Step C, dried and screened | Brown | 2.21 | — | 0.0524 | 221.0 | 4220 | 55 | 7.3 | Control |
| 3 | none, Step D, calcined | Green | 2.41 | 0.37 | 0.0370 | 199.0 | 5380 | 57 | 8.4 | Control |
| 4 | none, Step D, calcined (duplicate) | Green | 2.06 | — | 0.0412 | 232.6 | 5650 | 78 | 6.6 | Control |
| 5 | Step B, isoamyl alcohol refluxing(b) | Yellow Orange | 2.83 | 0.67 | 0.0403 | 199.0 | 4940 | 52 | 11.8 | Invention |
| 6 | Step B, isoamyl alcohol refluxing(b) | Yellow Orange | 2.83 | 0.67 | 0.0370 | 210.7 | 5700 | 46 | 13.6 | |
| 7 | Step B, isoamyl alcohol refluxing(b) | Orange Tan | 2.70 | 0.58 | 0.0304 | 152.2 | 5010 | 36 | 16.8 | Invention |
| 8 | Step B, isoamyl alcohol refluxing(b) | Brown | 2.43 | — | 0.0399 | 220.9 | 5540 | 42 | 16.6 | Invention |
| 9 | Step C, n-octanol(c) | Brown | — | — | 0.0356 | 171.7 | 4820 | 45 | 15.7 | Invention |
| 10 | Step D, isoamyl alcohol refluxing(d) | Tan | 2.14 | — | 0.0409 | 206.0 | 5040 | 49 | 12.0 | Invention |

TABLE I-continued
ETHYLENE POLYMERIZATION WITH TREATED CATALYSTS

| Run No. | Catalyst Pretreatment | Catalyst Properties Color | Pore Vol. cc/g | % Cr (VI) | Catalyst Weight g | Polymer Yield g | Calculated Productivity g polymer per g catalyst | Run Time Min. | Polymer Melt Index | Remarks |
|---|---|---|---|---|---|---|---|---|---|---|
| 11 | Step D, isoamyl alcohol refluxing[d] | Green Tan | 2.43 | 0.50 | 0.0470 | 266.0 | 5660 | 54 | 19.5 | Invention |

Notes:
[a] A dash signifies no determination was made.
[b] Step B catalyst still wet with ethyl acetate from azeotrope step was refluxed in isoamyl alcohol for 30 minutes, then recovered and dried in a vacuum oven overnight.
[c] Step C catalyst was refluxed in n-octanol for 30 minutes and recovered product was dried overnight in a vacuum oven.
[d] Step D catalyst was refluxed in isoamyl alcohol for 30 minutes, then recovered and dried in a vacuum oven overnight.

The results presented in Table I in runs 1-4 indicate that the control catalysts have a melt index potential, based on ethylene polymerization in a particle form process under the conditions specified before, ranging from about 7 to about 8. Invention runs 5-8 are duplicate runs made over about a 5 week period. Each catalyst was prepared from the same control catalyst sample but at different times by refluxing it in isoamyl alcohol, drying and activating. Polyethylene made with the catalysts had melt indexes ranging from 11.8 to 16.8. Thus, it is possible to improve the melt index potential of a catalyst made by azeotroping the cogel hydrogel containing a chromium compound with ethyl acetate to remove water, by simply refluxing the ethyl acetate-wetted product with an alcohol such as isoamyl alcohol. Invention Run 9, shows that the melt index potential of the dry, screened catalyst can be raised from 7.3 to 15.7 by refluxing it in n-octanol, then drying and activating it as described previously.

Invention Runs 10 and 11 demonstrate that the melt index potential of even calcined control catalyst can be substantially increased by refluxing it in isoamyl alcohol, then drying and activating it as described previously. No significant change in pore volume results by refluxing in the alcohol. Since the calcined catalyst contains no free water, the increase in melt index potential of the catalyst after refluxing in isoamyl alcohol cannot be related to removal of residual water. At present there is no explanation for the beneficial results obtained.

EXAMPLE 2

Another series of catalysts was prepared by contacting individual portions of the control catalysts in a liquid phase or gas phase mode. After the pretreatment each catalyst was activated in the manner described in Example 1. The pretreating conditions employed, if any, are as follows:

Run 12: none, control.
Run 13: 100 g dry catalyst was slurried in about 400 ml of dry n-hexane to which 20 weight percent of the catalyst weight (25 g) of isoamyl alcohol was added. The hexane was boiled off and the catalyst containing isoamyl alcohol was activated.
Run 14: Same as Run 13 except ethyl acetate was used in place of the hexane.
Runs 15, 16, 17: 27 g dry catalyst was slurried in 336 ml of a solution consisting of 10 volume percent n-octanol (or 20 volume percent in Runs 16 or 30 volume percent in Run 17) and 90 volume percent (or 80 volume percent or 70 volume percent) ethyl acetate. Each mixture was refluxed one hour at atmospheric pressure, the catalyst filtered out, dried in a vacuum oven and activated. The catalyst retained a portion of the n-octanol and contacting between it and the alcohol occurred during activation step.
Runs 18, 19: Same procedure as Runs 15-17 except the solution contained 5 volume percent benzyl alcohol and 95 volume percent ethyl acetate.
Run 20: 10 g previously calcined catalyst was raised to 300° F. in a CO stream and 1 cc (0.8 g) isopropanol was evaporated into the CO stream. The catalyst was then activated.
Run 21: 10 g previously calcined catalyst was held at 600° F. for one hour in a nitrogen environment saturated with methanol vapor. The catalyst was then activated.
Run 22: 10 g dry catalyst was raised to 400° F. under a stream of $N_2$ and then 1 cc isopropanol was evaporated into the gas stream. The catalyst was then activated.
Run 23: 100 gm of catalyst (37% solids, 63% ethyl acetate retained from azeotropic drying) was slurried in hexane to which 3 gm of Span 60 surfactant was added. Span 60, a product of Atlas Chemical Division, ICI United States, Inc., Wilmington, Delaware, was left on the catalyst (too large a molecule to be boiled away) when the hexane and ethyl acetate were evaporated away. Afterwards this catalyst was activated as described above. Span 60 is the monostearate ester of anhydrosorbitol.

Each catalyst was used to polymerize ethylene as described before. A summary of catalyst pretreating conditions employed, catalyst weights used and results obtained are given in Table II.

TABLE II

ETHYLENE POLYMERIZATION WITH TREATED CATALYSTS

| Run No. | Catalyst Pretreatment | Catalyst Properties Color | Pore Vol. cc/g | % Cr (VI) | Catalyst Weight g | Polymer Yield g | Calculated Productivity g polymer per g catalyst | Run Time Min. | Polymer Melt Index | Remarks |
|---|---|---|---|---|---|---|---|---|---|---|
| 12 | none - Step B catalyst dried as in Run 1 | Green | 2.29 | —(a) | 0.0465 | 183.4 | 3940 | 52 | 5.3 | control |
| 13 | 20 wt. % isoamyl alcohol in n-hexane | Brown | 2.53 | — | 0.0474 | 216.1 | 4650 | 40 | 14.2 | invention |
| 14 | 20 wt. % isoamyl alcohol in ethyl acetate | Brown | — | — | 0.0480 | 233 | 4850 | 63 | 7.2 | (b) |
| 15 | refluxed in 10% octanol 90% ethyl acetate | Brown | 1.86 | — | 0.0525 | 247.2 | 4710 | 52 | 9.1 | invention |
| 16 | refluxed in 20% octanol 80% ethyl acetate | Brown | 1.89 | — | 0.0509 | 264.9 | 5200 | 58 | 11.7 | invention |
| 17 | refluxed in 30% octanol 70% ethyl acetate | Brown | 1.87 | — | 0.0480 | 246 | 5120 | 51 | 9.7 | invention |
| 18 | refluxed in 5% benzyl alcohol 95% ethyl acetate | Brown | — | — | 0.0509 | 242.5 | 4760 | 49 | 6.7 | (b) |
| 19 | refluxed in 5% benzyl alcohol 95% ethyl acetate | Brown | — | — | 0.0234 | 202 | 6630 | 50 | 8.6 | (b) |
| 20 | isopropanol vapor + CO at 300° F. (149° C.) | Tan | 2.19 | — | 0.0444 | 201.1 | 4530 | 50 | 8.2 | (b) |
| 21 | methanol vapor + N$_2$ to 600° F. (316° C.) | Green Tan | 2.52 | — | 0.0383 | 205 | 5350 | 46 | 9.3 | invention |
| 22 | isopropanol vapor + N$_2$ to 400° F. (204° C.) | Brown | 2.05 | — | 0.0504 | 224 | 4450 | 48 | 7.5 | (b) |
| 23 | Span 60 surfactant impregnated from hexane | Brown | 2.56 | — | 0.0361 | 176 | 4890 | 39 | 10.3 | invention |

Notes:
(a)A dash signifies no determination was made.
(b)Outside the scope of the invention.

Untreated catalysts according to the previous example have melt index potentials ranging up to about 8 as do catalysts treated with benzyl alcohol. Thus, invention catalysts in this example are considered to be those that have melt index potentials of about 9 or greater.

Catalyst pretreating (impregnation) with liquids is shown in Runs 13–19 and with vapors in Runs 20–22. Both techniques can give approximately the same good results providing the right selection of treating agents and/or conditions are observed. When liquids are employed, effective contact of catalyst with the hydroxy compound at an elevated temperature results after the solvent is removed.

The invention catalyst in Run 13 is given a pretreatment in a mixture consisting of isoamyl alcohol and n-hexane whereas comparison catalyst 14 is pretreated in an isoamyl alcohol-ethyl acetate mixture. Refluxing is not employed. It is evident that under the conditions employed, even in the presence of isoamyl alcohol, ethyl acetate cannot be substituted for n-hexane to produce equivalent catalysts.

In invention Runs 15–17, the catalysts are pretreated in refluxing mixtures of n-octanol and ethyl acetate. Under the conditions employed the presence of ethyl acetate does not affect subsequent catalyst performance in the same manner observed in comparison Run 14.

In control Runs 18, 19 benzyl alcohol is used in combination with ethyl acetate under refluxing conditions to pretreat the catalyst. The results obtained suggest that, (a) insufficient alcohol is employed only 5 volume percent compared to 1030 volume percent in Runs 15–17, and/or (b) benzyl alcohol is not equivalent to n-octanol in the treating process employed.

Pretreating the catalyst at an elevated temperature in the presence of an alcohol vapor and a gas yield catalyst having improved melt index capability compared to the results obtained with the control catalyst of Run 12. The results suggest a critical feature is the temperature employed which should be greater considering the results obtained with a methanol-nitrogen pretreatment at 600° F. in invention Run 21.

In Run 23, the hydroxy compound is a high boiling viscous liquid which, like the other runs where impregnation is employed, remains on the catalyst after the solvent is evaporated. During the first phase of activation, the catalyst is exposed to the hydroxy compound at elevated temperatures.

We claim:

1. A method for activating either a dry, raw or a calcined catalyst of inorganic or organic chromium compound dispersed on a silica-containing substrate comprising two, distinct treatments which can be performed in any order, said treatments comprising:
   (1) contacting said catalyst with a normally liquid organic, aliphatic hydroxy compound; and
   (2) reducing said catalyst at an elevated temperature in a carbon monoxide containing environment to produce a reduced treated composition, and then oxidizing said reduced catalyst in an oxygen-containing environment at elevated temperature.

2. A method of claim 1 wherein said normally liquid organic aliphatic hydroxy compound is chosen from among the group consisting of alcohols, simple and polymeric glycols, the monoalkyl ethers and dialkyl ethers of simple and polymeric glycols; and anhydrosorbitols and fatty acids thereof.

3. A method of claim 1 wherein said catalyst is contacted with said hydroxy compound in liquid phase.

4. A method of claim 3 wherein said contacting is in the presence of a second organic compound having a lower boiling point than said hydroxy compound.

5. A method of claim 1 wherein said contacting with said hydroxy compound is accomplished in gas phase.

6. A method of claim 5 wherein said contacting is in the presence of another gas or vaporized organic compound.

7. A method of claim 6 wherein said contacting is carried out at a temperature at or above the boiling point of said hydroxy compound.

* * * * *